United States Patent

[11] 3,598,427

| [72] | Inventor | James Owen Lavery<br>Setauket, N.Y. |
|------|----------|-------------------------------------|
| [21] | Appl. No. | 784,394 |
| [22] | Filed | Dec. 17, 1968 |
| [45] | Patented | Aug. 10, 1971 |
| [73] | Assignee | Garsite Products Inc.<br>Deer Park, N.Y. |

[54] LIQUID FIFTH WHEEL ASSEMBLY
28 Claims, 4 Drawing Figs.

[52] U.S. Cl. ................................................. 280/421,
280/433
[51] Int. Cl. ........................................... B60d 1/08
[50] Field of Search .......................................... 280/421-
—423, 432, 438, 440, 433

[56] References Cited
UNITED STATES PATENTS

| 1,982,052 | 11/1934 | Hennessy .................... | 280/421 |
| 2,007,041 | 7/1935 | Dorsey ........................ | 280/438 X |
| 2,038,265 | 4/1936 | Bradley ....................... | 280/423 |
| 2,094,399 | 9/1937 | Fuchs .......................... | 280/421 |
| 2,250,825 | 7/1941 | Evans .......................... | 280/421 X |
| 2,673,094 | 3/1954 | Martin .......................... | 280/438 |
| 2,784,009 | 3/1957 | Braunberger ................ | 280/440 |
| 2,856,203 | 10/1958 | Kayler ......................... | 280/440 |
| 3,194,442 | 7/1965 | Sjoblom ....................... | 222/176 |
| 3,325,185 | 6/1967 | Higby .......................... | 280/432 |
| 3,463,512 | 8/1969 | Hodgson ..................... | 280/432 |

*Primary Examiner*—Leo Friaglia
*Attorney*—Phillip D. Amins

ABSTRACT: The present invention pertains to a liquid fifth wheel assembly for use with tractor and trailer combinations wherein the trailer includes a tank body for the storage and transportation of fluids, and the tractor includes a pumping station adapted to deliver the fluid stored in the tank. The fifth wheel assembly which is secured to the underside of the trailer comprises upper and lower mounting plates, an annular ball bearing assembly disposed between the mounting plates and secured therebetween, a subframe member having an upper mounting bracket secured thereto and descending therefrom and adapted to be placed in bearing secured engagement with a lower mounting bracket secured to the tractor, wherein the entire assembly has a central opening therein through which passes an enclosed pipe structure interconnecting the tank and the pump station; the pipe structure including a swivel joint for permitting rotational movement of the enclosed pipe.

3,598,427

INVENTOR.
JAMES OWEN LAVERY
BY Philip D. Amino
ATTORNEY

INVENTOR.
JAMES OWEN LAVERY
BY Philip D. Amino
ATTORNEY

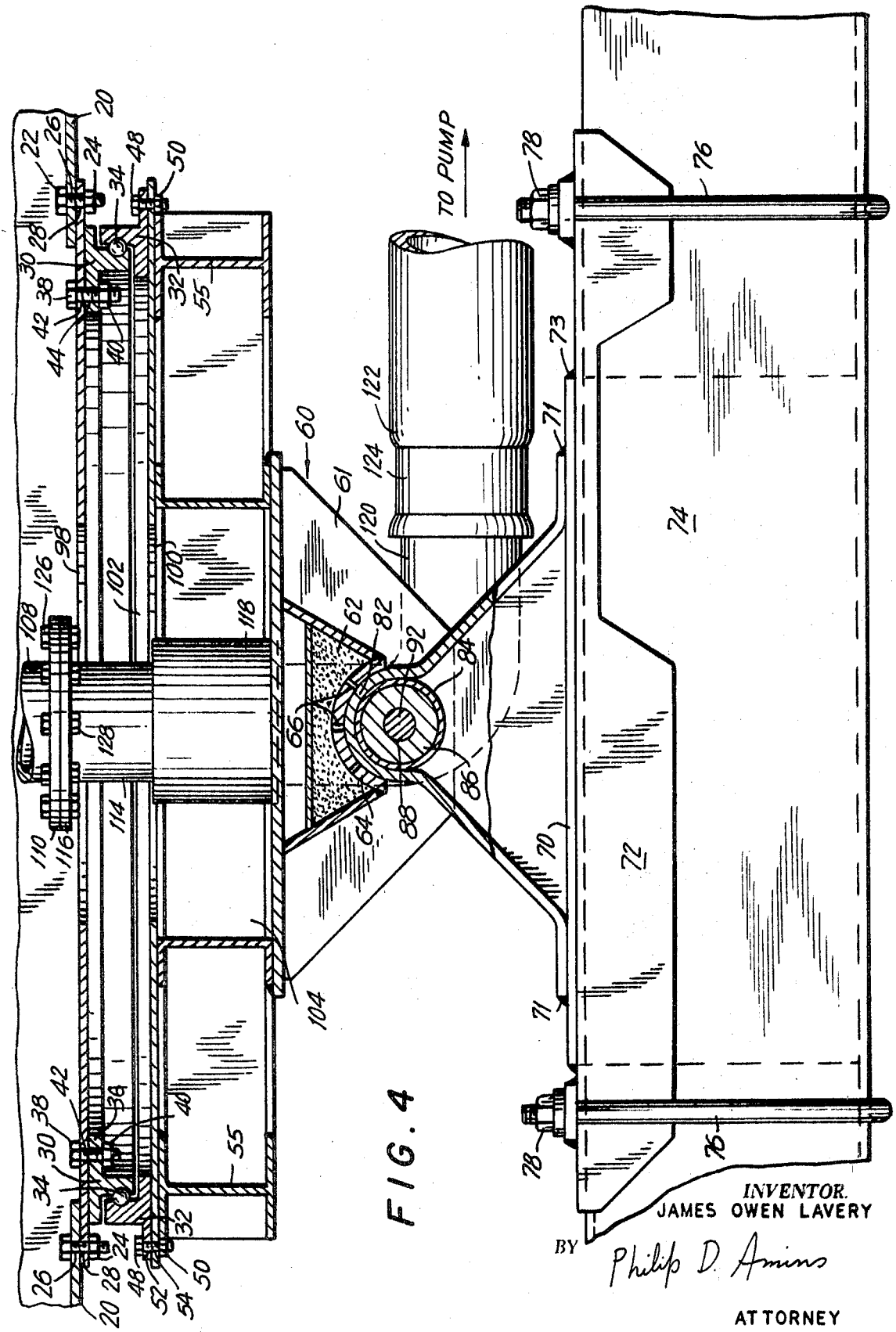

LIQUID FIFTH WHEEL ASSEMBLY

BACKGROUND OF THE INVENTION

The present invention pertains to a liquid fifth wheel assembly for use in conjunction with tractor-trailer combinations and, more particularly, to a liquid fifth wheel assembly which is positionally secured to the underside of the trailer and need not be removed when separating the trailer and tractor.

Heretofore, fifth wheel assemblies for connecting tractors and trailers have almost universally employed king pin connections. In cases where a liquid fifth wheel has been required, it has been necessary to dismantle the fifth wheel assembly in order to disengage the tractor from the trailer.

The necessity of disassembling the prior art liquid fifth wheel assemblies to disengage the tractor from the trailer has required much time and accompanying expense along with the increased propensity for damaging the parts of the liquid fifth wheel assembly due to the constant assembling and disassembling thereof.

SUMMARY OF THE INVENTION

It is, therefore, the primary object of the present invention to provide a liquid fifth wheel assembly for use in conjunction with tractor and fluid tank type trailer combinations wherein the entire assembly is not required to be disassembled when detaching the tractor from the trailer.

It is another object of the present invention to provide a liquid fifth wheel assembly wherein the assembly is positionally secured to the underside of the front of the trailer even when the trailer is detached from the tractor part of the combination.

It is a further object of the present invention to provide a fifth wheel assembly for use in conjunction with tractor-trailer combinations wherein the assembly remains positionally secured to the front underside portion of the trailer even when the trailer and tractor are detached and wherein the fifth wheel assembly is capable of rotational movement in both the horizontal and vertical planes while securing the tractor and trailer with respect to one another.

It is yet another object of the present invention to provide a fifth wheel assembly of the aforementioned type wherein the fifth wheel assembly is positionally secured by means of only two securing pins which have no shearing stress applied thereto.

It is yet a further object of the present invention to provide a liquid fifth wheel assembly for interconnecting a fluid tank type trailer and a tractor having a pumping station, wherein the liquid fifth wheel assembly is formed with a central opening through which passes an enclosed pipe structure connected at one end to the fluid tank and at the other end to the pumping station by means of a coupling hose and wherein the piping structure is entirely separate and apart from, and in no way connected to, said liquid fifth wheel assembly.

It is still another object of the present invention to provide a liquid fifth wheel assembly of the aforementioned type wherein the enclosed piping structure includes, as an integral part thereof, a swivel joint to permit the fluid transmission system from the tank to the pumping station to be decoupled by merely disconnecting the coupling hose from the pumping station and swinging the hose out of position.

BRIEF DESCRIPTION OF THE DRAWINGS

These and other objects, features and advantages of the present invention will become more apparent from the following detailed description considered in conjunction with the accompanying drawings wherein:

FIG. 4 is a sectional view taken on the line 4-4 of FIG. 3.

DESCRIPTION OF THE PREFERRED EMBODIMENT

Figure 1:
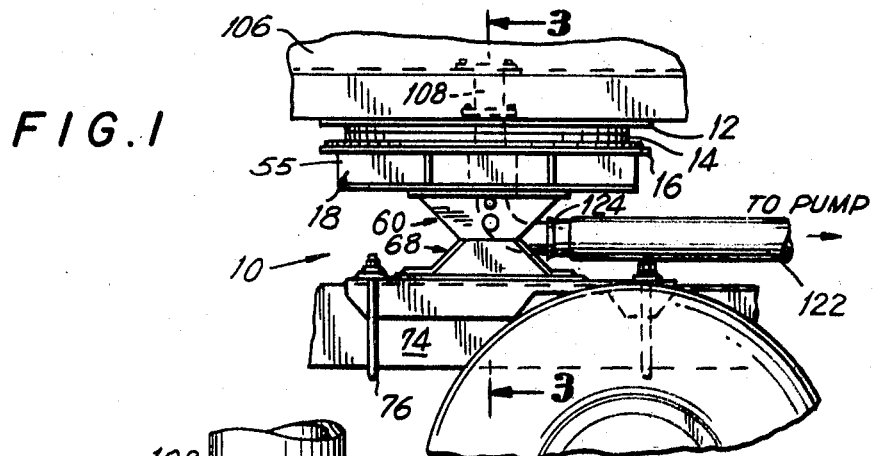
FIG. 1 is a side fragmentary view of a tractor and fluid tank-type trailer combination connected together by means of a liquid fifth wheel assembly constructed in accordance with the principles of the present invention.

Referring now to the drawings, and more particularly to FIG. 1 thereof, there is shown the liquid fifth wheel assembly of the present invention which is designated generally by the reference numeral 10. As can best be seen by reference to FIGS. 2 through 4, the assembly 10 includes an upper mounting plate 12, an annular ring bearing 14, a lower mounting plate 16 and a structural subframe 18, all of which are preferably fabricated from steel.

The upper mounting plate 12 is secured to the underside of the trailer chassis 20, at the front end thereof, by means of a plurality of bolts 22 and nuts 24, the bolts passing through holes 26 and 28 formed in the chassis underside 20 and upper mounting plate 12, respectively.

The annular ring bearing 14 comprises an inner bearing race 30, an outer bearing race 32 and ball bearings 34.

The inner bearing race 30 has an inwardly extending peripheral flange 36 and is secured to the upper mounting plate 12 by means of bolts 38 and nuts 40, the bolts passing through openings 42 and 44 formed in the upper mounting plate 12 and inwardly extending flange 36, respectively.

The outer bearing race 32 has an outwardly extending peripheral flange 46 and is secured to the lower mounting plate 16 by means of bolts 48 and nuts 50, the bolts passing through openings 52 and 54 in the outwardly extending flange 46 and the lower mounting plate 16, respectively.

Figure 3:
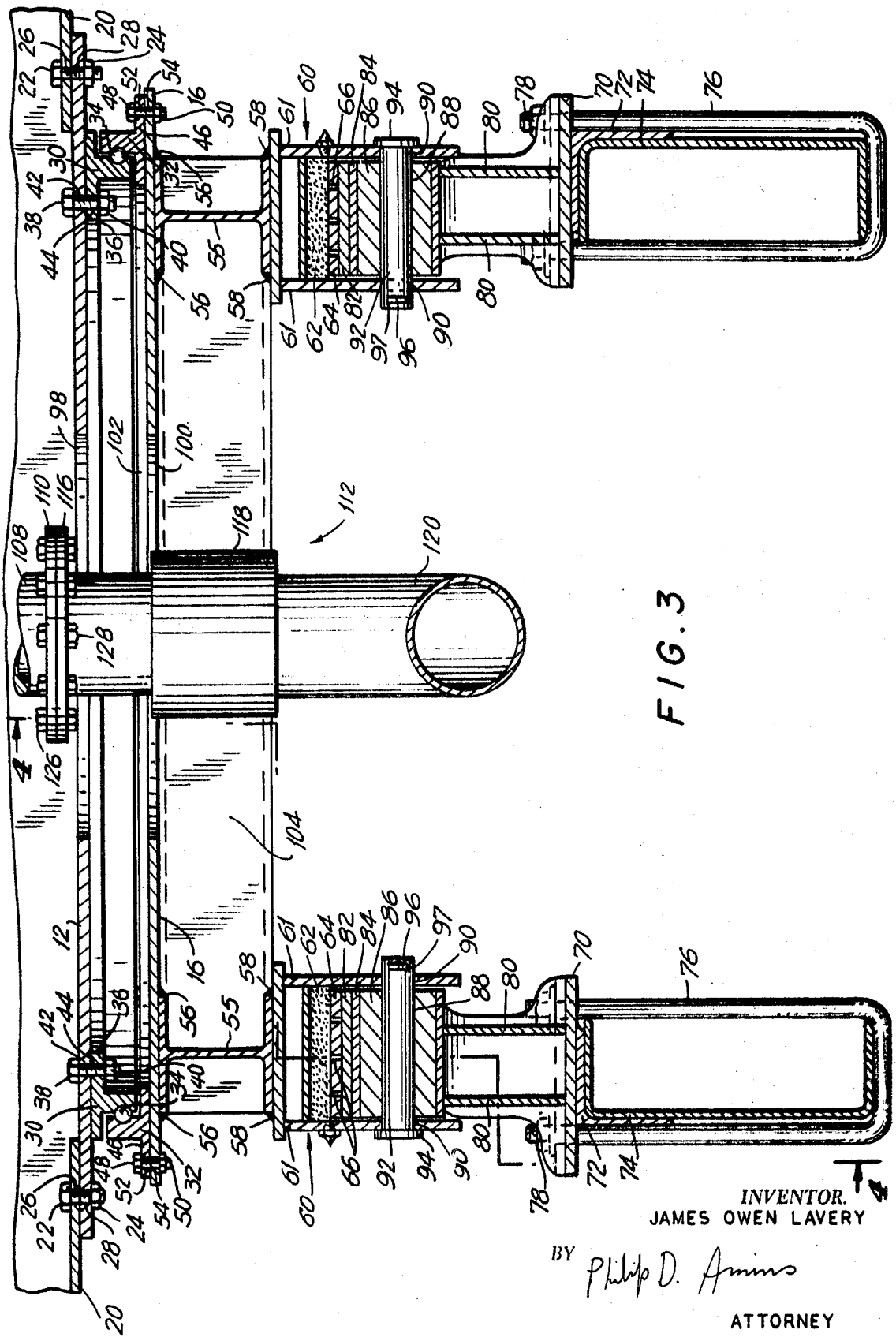
FIG. 3 is a sectional view taken on the line 3-3 of FIG. 1 showing the tractor and trailer in secured relationship.

The structural subframe 18 comprises four I-beams 55 welded together and is secured to the lower mounting plate 16, such as by means of welds 56. Also secured to the structural subframe 18, such as by means of welds 58, are a pair of upper support bearings 60 each having sidewalls 61 and integral grease retaining chambers 62, as best seen in FIGS. 3 and 4. The grease retaining chambers define concave arcuate bearing walls 64 which are lubricated by grease passing from the grease retaining chambers thereto via the openings 66 in said walls 64, the purpose of which will be described in more detail hereinafter.

The assembly 10 also includes a pair of lower bearing brackets or trunnions 68. The trunnions have flanges 69 which are welded to a support plate 70 as at 71. The support plate 70 is in turn welded to a framebed 72 as at 73. The framebed 72 itself is secured to the frame rails or chassis 74 of the tractor by means of threaded U-bolts 76 and nuts 78.

The lower bearing brackets or trunnions 68 each have a pair of gusset plates 80 and each includes an upper arcuate convex bearing wall 82 within which is welded a cylindrical member 84. Disposed within the cylindrical member 84 is a cylindrical shock bushing 86 which is preferably fabricated from a synthetic rubber material and which has a central opening 88 therein.

The upper support bearings 60 have lateral openings 90 formed in both of the sidewalls 61 thereof. With the upper support bearings placed upon the lower bearing brackets the bearing walls 64 are in bearing engagement with the bearing walls 82 and the openings 88 and 90 are in axial alignment. The upper support bearings 60 are then positionally secured with respect to the lower bearing brackets 68 by pins 92 having heads 94. The pins pass through the axially aligned openings 88 and 90 and are secured therein by means of cotter-type pins 96 passing through openings 97 in the ends of the pins 92 remote from the heads 94.

It is herein to be noted that although the pins 92 positionally secure the bearings 60 to the brackets 68, they are not subjected to any shear stress. The pins are protected from any vertical shearing or shock forces by the shock bushing 86. The entire bearing force for the rotational movement about the vertical plane of the fifth wheel assembly 10 is borne by the bearing surfaces of the walls 64 and 82 which are lubricated by the grease passing thereto through the grease openings 66 in the walls 64.

Of course, rotational movement about the horizontal plane is provided by means of the ring bearing 14.

The upper mounting plate 12 is formed with a central circular opening 98 and the lower mounting plate 16 is formed with a central circular opening 100 while the annular ring 14 defines a circular opening 102 therethrough. All the openings 98, 100 and 102 are in axial alignment with one another and the openings 98 and 100 are of substantially equal diameter.

The structural subframe 18 defines a rectangular opening 104.

When the members of the assembly are secured to one another as described hereinbefore, the upper mounting plate 12, the annular ring bearing 14, the lower mounting plate 16, the structural subframe 18 and the upper support bearings 60 form an integral member which is secured to the front underside 20 of the trailer chassis, whereby substantially the entire liquid fifth wheel assembly is positionally secured with respect to the trailer at the front underside thereof. In this position, the opening 104 in structural subframe member 18 is in alignment with the axially aligned openings 98, 100 and 102 in the upper mounting plate 12, the lower mounting plate 16 and the annular ring bearing 14, respectively, thereby defining an opening which passes through the entire fifth wheel assembly 10.

As best seen in FIG. 1, the trailer includes a fluid storage tank 106 which tank has a downwardly extending pipe fitting 108 disposed therein in fluidtight relationship. The pipe fitting 108 which extends downwardly from the tank near the front underside of the chassis 20, has an external peripheral flange 110 at the bottom end thereof.

Figure 2:
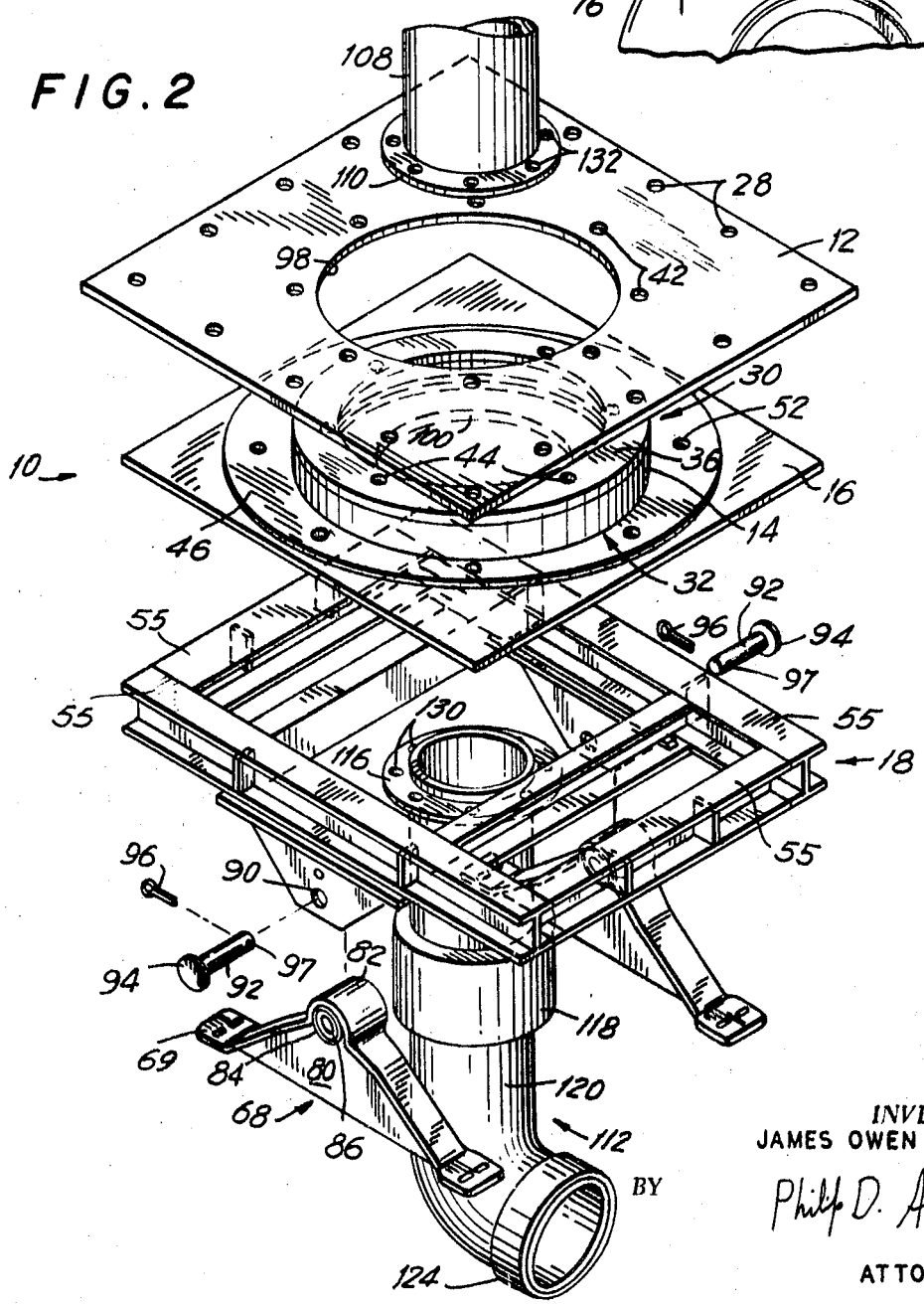
FIG. 2 is an exploded view in perspective of the liquid fifth wheel assembly of the present invention in conjunction with the fluid flow pipe of the tank-type trailer.

An enclosed pipe structure designated generally by the reference numeral 112 (as best seen in FIG. 2) comprises an upper pipe or conduit 114 having an external peripheral flange 116, a liquid-tight rotatable swing joint 1118 having a right-angle lower pipe, conduit or elbow 120 connected thereto and rotatable therewith. The end of the elbow 120 remote from the swing joint 118 is connected to a coupling hose 122 via a coupling 12. The other end of the hose is connected to a pump (not shown) located on the tractor and is preferably controllable from inside the tractor.

The flange 116 is connected to the flange 110 in fluidtight relationship by means of bolts 126 and nuts 128, the bolts 126 passing through holes 130 and 132 formed in the flanges 116 and 110, respectively.

It will thus be seen that the enclosed pipe structure provides for fluid transmission from the tank 106 to the pump station positioned on the tractor, from whence the fluid is dispensed. Although the transmission path and structure therefor is through the fifth wheel assembly 10, it is completely independent of the assembly itself and is not connected thereto in any manner.

In the operation of the tractor and trailer combination, and more particularly, when it is desired to separate the tractor from the trailer, all that need be done is to remove the pins 92 after first removing the cotter-type pins 96. With the pins 92 removed, the coupling hose 122 is decoupled from the pump and swung in a horizontal plane towards the trailer by means of the swivel joint 118.

It will thus be seen that substantially the entire fifth wheel assembly remains secured to the front underside of the trailer chassis even when the trailer is separated from the tractor.

When it is desired to reconnect the trailer to the tractor, all that need be done is to reinsert the two positioning pins 92 and to recouple the hose 122 to the pump by swinging the same in a horizontal plane away from the trailer and towards the tractor.

It is herein to be noted that although many members of the liquid fifth wheel assembly 10 have been described as being welded together, in many instances it is equally suitable to bolt the same together or to use any other suitable connecting means. Similarly, although many members have been described as being bolted together, it would also be possible to weld the same or connect them together by any other suitable connecting means.

It is thus seen that I have provided a new and novel liquid fifth wheel assembly which always remains secured to the trailer and which permits simple and easy fluid transmission from the tank of the trailer to the pump station on the tractor and which permits ease in connecting and separating the tractor-trailer combination.

While I have shown and described the preferred embodiment of my invention, there are many modifications, changes and improvements which may be made therein by those skilled in the art without departing from the spirit and scope thereof as defined in the appended claims.

What I claim is:

1. In a tractor and trailer combination, the improvement comprising a fifth wheel assembly substantially entirely secured to the front underside of the trailer during separation and connection of the trailer and the tractor and during operation of said tractor and trailer combination, said fifth wheel assembly including means disposed upon said tractor and adapted to receive said fifth wheel assembly secured to the underside of said trailer in bearing engagement, means for positionally securing said fifth wheel assembly on the underside of said trailer to said means disposed upon said tractor, and said last mentioned means receiving substantially none of the shear forces presented to said fifth wheel assembly.

2. A tractor and trailer combination as in claim 1, wherein said positional securing means comprises pin members.

3. A tractor and trailer combination as in claim 1, wherein said bearing engagement of said means disposed upon said tractor and said fifth wheel assembly secured to the underside of said trailer permits rotational movement of said fifth wheel assembly in vertical plane, and said fifth wheel assembly secured to the underside of said trailer including means to permit rotational movement of said fifth wheel assembly in a horizontal plane.

4. A tractor and trailer combination as in claim 3, wherein said fifth wheel assembly secured to the underside of said trailer includes upper support bearings extending downwardly therefrom, said means disposed upon said tractor comprises lower bearing brackets, said upper support bearings and said lower bearing brackets are disposed in abutting bearing engagement, and said upper support bearings including lubricating means adapted to lubricate the abutting surfaces of said upper support bearings and said lower bearing brackets to thereby facilitate rotational movement thereof about a vertical plane.

5. A tractor and trailer combination as in claim 4, including first and second upper support bearings and first and second lower bearing brackets adapted to be placed in bearing engagement with one another, respectively, each of said upper support bearings including a pair of sidewalls, and said lubricating means comprising grease retaining chambers formed integrally with said upper support bearings and disposed between at least a portion of the sidewalls thereof, and means disposed between said grease retaining chambers and said abutting bearing surfaces of said upper support bearings and said lower bearing brackets to permit the flow of grease from said grease retaining chambers to said abutting bearing surfaces.

6. A tractor and trailer combination as in claim 5, wherein the bearing surface of said upper support bearings are of an arcuate concave configuration, the bearing surfaces of said lower bearing brackets are of an arcuate convex configuration, and said means disposed between said grease retaining chambers and said abutting bearing surfaces comprises at least one opening in the arcuate concave bearing surface of said upper support bearings.

7. A tractor and trailer combination as in claim 4, including first and second upper support bearings and first and second lower bearing brackets adapted to be placed in bearing engagement with one another, respectively, each of said upper support bearings including a pair of sidewalls, each of said sidewalls having a laterally extending opening therein, each of said lower bearing brackets having a laterally extending opening therein, said lower bearing brackets being disposed between said sidewalls of the said upper support bearings, respectively, with the openings in said sidewalls being in axial alignment with the opening in said lower bearing bracket, and said positional securing means comprising pin members positioned within said axially aligned openings.

8. A tractor and trailer combination as in claim 7, including retaining means secured to one end of said pin members to maintain said pin members in position within said axially aligned openings.

9. A tractor and trailer combination as in claim 7, wherein said laterally extending openings in said lower bearing brackets having a bushing positioned therewithin for absorbing any shock forces which might be imparted to said pin members projecting therethrough.

10. A tractor and trailer combination in claim 9, wherein said means to permit rotational movement of said fifth wheel assembly in a horizontal plane comprises an annular ball bearing ring.

11. A tractor and trailer combination as in claim 10, wherein said fifth wheel assembly secured to the front underside of said trailer includes an upper mounting plate, a lower mounting plate, and a structural subframe, means connecting said annular ball bearing ring between said upper and lower mounting plates, means connecting said lower mounting plate to said structural subframe, means connecting said upper mounting plate to said front underside of said trailer, and means connecting said upper support bearings to the underside of said structural subframe at opposite sides thereof.

12. A tractor and trailer combination as in claim 11, wherein said upper mounting plate, said lower mounting plate, and said structural subframe have substantially axially aligned openings therein which are in substantial axial alignment with the opening in said annular ball bearing ring, thereby forming an opening extending through the entire fifth wheel assembly secured to the front underside of said trailer.

13. A tractor and trailer combination as in claim 12, wherein said lower bearing brackets are secured to the chassis of said tractor at opposite sides thereof.

14. A tractor and trailer combination as in claim 1, wherein said trailer is one of the type having a tank body thereon adapted to store and transport fluids, said tractor is of the type having a fluid pump thereon, said fifth wheel assembly secured to the front underside of said trailer having an opening extending therethrough, conduit means extending downwardly from said tank body in fluidtight communication therewith, means connected between said conduit means and said pump to permit fluid flow between said tank and said pump, and said connecting means being disposed within said opening in said fifth wheel assembly but separate and apart therefrom.

15. A tractor and trailer combination as in claim 14, wherein said connecting means is detachably coupled to said pump.

16. A tractor and trailer combination as in claim 15, wherein said connecting means includes swivel means whereby said connecting means can be swiveled towards and away from said pump.

17. A tractor and trailer combination as in claim 14, wherein said bearing engagement of said means disposed upon said tractor and said fifth wheel assembly secured to the underside of said trailer permits rotational movement of said fifth wheel assembly in a vertical plane, and said fifth wheel assembly secured to the underside of said trailer including means to permit rotational movement of said fifth wheel assembly in a horizontal plane.

18. A tractor and trailer combination as in claim 17, wherein said fifth wheel assembly secured to the underside of said trailer includes upper support bearings extending downwardly therefrom, said means disposed upon said tractor comprises lower bearing brackets, said upper support bearings and said lower bearing brackets are disposed in abutting bearing engagement, and said upper support bearings including lubricating means adapted to lubricate the abutting surfaces of said upper support bearings and said lower bearing brackets to thereby facilitate rotational movement thereof about a vertical plane.

19. A tractor and trailer combination as in claim 18, including first and second upper support bearings and first and second lower bearing brackets adapted to be placed in bearing engagement with one another, respectively, each of said upper support bearings including a pair of sidewalls, and said lubricating means comprising grease retaining chambers formed integrally with said upper support bearings and disposed between at least a portion of the sidewalls thereof, and means disposed between said grease retaining chambers and said abutting bearing surfaces of said upper support bearings and said lower bearing brackets to permit the flow of grease from said grease retaining chambers to said abutting bearing surfaces.

20. A tractor and trailer combination as in claim 19, wherein the bearing surfaces of said upper support bearings are of an arcuate concave configuration, the bearing surfaces of said lower bearing brackets are of an arcuate convex configuration, and said means disposed between said grease retaining chambers and said abutting bearing surfaces comprises at least one opening in the arcuate concave bearing surface of said upper support bearings.

21. A tractor and trailer combination as in claim 18, including first and second upper support bearings and first and second lower bearing brackets adapted to be placed in bearing engagement with one another, respectively, each of said upper support bearings including a pair of sidewalls, each of said sidewalls having a laterally extending opening therein, each of said lower bearing brackets having a laterally extending opening therein, said lower bearing brackets being disposed between said sidewalls of the said upper support bearings, respectively, with the openings in said sidewalls being in axial alignment with the opening in said lower bearing bracket, and said positional securing means comprising pin members positioned within said axially aligned openings.

22. A tractor and trailer combination as in claim 21, including
retaining means secured to one end of said pin members to maintain said pin members in position within said axially aligned openings.

23. A tractor and trailer combination as in claim 21, wherein
said laterally extending openings in said lower bearing brackets having a bushing positioned therewithin for absorbing any shock forces which might be imparted to said pin members projecting therethrough.

24. A tractor and trailer combination as in claim 23, wherein
said means to permit rotational movement of said fifth wheel assembly about a horizontal plane comprises
an annular ball bearing ring.

25. A tractor and trailer combination as in claim 24, wherein
said fifth wheel assembly secured to the front underside of said trailer includes
an upper mounting plate,
a lower mounting plate, and
a structural subframe,
means connecting said annular ball bearing ring between said upper and lower mounting plates,
means connecting said lower mounting plate to said structural subframe,
means connecting said upper mounting plate to said front underside of said trailer, and
means connecting said upper support bearings to the underside of said structural subframe at opposite sides thereof.

26. A tractor and trailer combination as in claim 25, wherein
said upper mounting plate, said lower mounting plate, and said structural subframe have substantially axially aligned openings therein which are in substantial axial alignment with the opening in said annular ball bearing ring, thereby forming said opening extending through the entire fifth wheel assembly secured to the front underside of said trailer.

27. A tractor and trailer combination as in claim 26, wherein
said lower bearing brackets are secured to the chassis of said tractor at opposite sides thereof.

28. A tractor and trailer combination as in claim 1, wherein
said trailer is of the type having a tank body thereon adapted to store and transport fluids,
said tractor is of the type having a fluid pumping station thereon,
said tank body having a conduit in fluidtight relationship extending downwardly therefrom,
said fifth wheel assembly secured to the front underside of said trailer having an opening extending therethrough,
a pipe structure including an upper pipe, a swivel joint and a right-angle lower pipe,
said upper pipe having its lower end connected to said swivel joint,
said right-angle lower pipe having its upper end connected to said swivel joint,
means connecting the upper end of said upper pipe to the lower end of the conduit extending downwardly from said tank,
detachable means coupling the lower end of said right-angle lower pipe to said pump means, and
said pipe structure being disposed within said laterally extending opening in said fifth wheel assembly secured to the front underside of said trailer but independent and separate and apart therefrom.